July 4, 1950 H. K. CHANDLEY 2,514,183
SAFETY INNER TUBE

Filed June 16, 1947 5 Sheets-Sheet 1

INVENTOR.
HENRY K. CHANDLEY
BY
ATTORNEYS.

INVENTOR.
HENRY K. CHANDLEY
BY
ATTORNEYS.

July 4, 1950 H. K. CHANDLEY 2,514,183
SAFETY INNER TUBE

Filed June 16, 1947 5 Sheets-Sheet 4

INVENTOR.
HENRY K. CHANDLEY

BY

ATTORNEYS.

July 4, 1950 H. K. CHANDLEY 2,514,183
SAFETY INNER TUBE

Filed June 16, 1947 5 Sheets-Sheet 5

INVENTOR.
HENRY K. CHANDLEY
BY
ATTORNEYS.

Patented July 4, 1950

2,514,183

UNITED STATES PATENT OFFICE 2,514,183

SAFETY INNER TUBE

Henry K. Chandley, Dayton, Ohio, assignor to The Firestone Tire & Rubber Company, Akron, Ohio, a corporation of Ohio Application June 16, 1947, Serial No. 754,993

9 Claims. (Cl. 154—14)

This invention relates to inner tubes for pneumatic tires and method of building same. It relates more particularly to a method of building safety tubes of the type having a plurality of air receiving compartments, an inner and an outer compartment in the present instance.

Pneumatic tire inner tubes now in general use are of a single tube type. In the event of a tire blowout, or a large rupture of the wall of a single compartment tube when such tube is in service the tire in which it is mounted will abruptly collapse. If, at the time the tire collapses, it is in service on a fast moving automobile, there is danger that the automobile on which it is mounted will go out of control of its driver and cause a serious wreck.

To reduce to a minimum the danger of occupants of automobiles and property damage from sudden, or quick collapse of pneumatic tires in service, tire engineers, heretofore, have provided inner tubes with multiple air compartments. One such type tube now commercially available, comprises an inner and an outer air compartment so constructed that when the outer compartment loses its air pressure and collapses, the inner compartment will sustain the load on the tire, in which it is mounted, for sufficient time for a driver to bring a fast moving automobile safely to a stop. However, until the present invention, none such tubes have proven entirely satisfactory. One fault of the prior art was the high cost of the finished tube. Another fault of tubes heretofore commercially available was that the wall of the inner compartment of the tube was at least partially vulcanized before it was attached to the wall of the outer compartment which made it very difficult, if over possible, to obtain a good union between the walls of the inner and outer compartment at their base portions. Upon the advent of high speed automobiles having sensitive steering controls, both dynamic and static balance of front wheels became an important requisite in avoiding shimmying of these wheels. A serious objection to safety tubes having an inner and an outer compartment has heretofore been that when installed they often threw wheels out of balance due to the out of balance of the tubes. A factor in causing the out of balance of such tubes was the wilting or drooping of the walls of the inner compartment during molding and vulcanization of the tubes.

The present invention contemplates the complete assembling of the components of a tube of the type having a plurality of compartments, before any of the components, except the valve members have been subjected to a molding or vulcanization operation.

An object of the invention is to provide a safety tube having an inner and an outer compartment whose longitudinal center lines lie in a plane dividing the tube base circumferentially in half and being at a right angle to the axis of the tube.

Another object of the present invention is to provide a safety tube with inner and outer compartments wherein each compartment is formed of a complete tube.

Another object of the invention is to provide a plural compartment tube having an improved union between the base portions of tubes forming the compartments.

A further object of the invention is to provide a unit-cure method of manufacturing a plural compartment tube thereby reducing labor and vulcanizing cost.

Still another object of the invention is to provide a method of vulcanizing a safety tube of the multiple compartment type whereby the union between the inner and outer compartment walls is unvulcanized previous to the vulcanization of the tube and whereby the rubber composing the tube is uniformly vulcanized throughout.

Yet another object of the invention is to provide a multiple chamber safety inner tube so constructed that it may be cured with internal steam and substantially drained dry of condensate.

The safety inner tube per se of the foregoing objects is the subject of my copending divisional application Serial No. —, filed June 2, 1950.

Other objects and advantages will become apparent from the following description taken in conjunction with the accompanying drawings.

It is to be understood that in practicing the method the components of the tube may be assembled on a building drum, or if desired entirely on a table, or partly on a table and partly on a building drum, or by the aid of any means found satisfactory. The steps in the method of making the present tube will be explained using a building drum, it being considered unnecessary for a complete disclosure of the invention to repeat the discussion of these steps when taken in conjunction with a table, band building machine or the like. It is also to be understood that with the exception of the molded valve stems that the tube is first fabricated of unvulcanized rubber or rubberized fabric, and that the conventional operations in the art of applying solvents to clean and make tacky the surface of the rubber will not always be set out as a separate step but that washing, dusting, buffing, cementing, and drying are done whenever and wherever good practice in the art indicates that they should be done.

Figure 1:
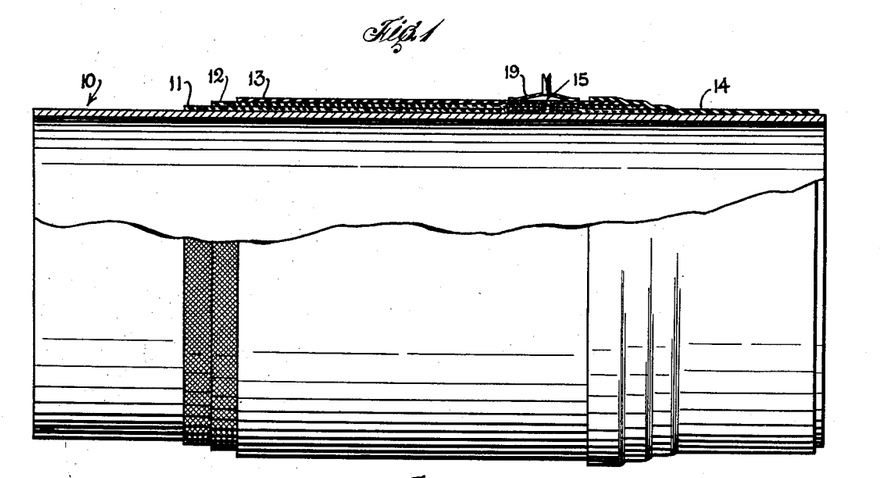
Fig. 1 is a longitudinal elevation broken away and partly in sectional view through a tube building drum showing the components of the inner compartment of a tube embodying the present invention, said components being shown in their initial position thereon.

The inner compartment 1 of a tube 40 is first assembled by placing a ply 11 of rubberized cord fabric about a preferably collapsible building drum 10 with the cords of the fabric extending diagonally of ply 11. Next, a second ply 12, narrower than ply 11 and also composed of rubberized cord fabric, is laid centrally upon ply 11. The step-off between the edges of plies 11 and 12 is preferably not less than ⅜". The cords of ply 12 extend diagonally thereof to cross the diagonally disposed cords of ply 11.

A rubber inside layer 13, which is narrower than ply 12, is next centered thereon with the step-off distance between the edges of the layer 13 and the edges of ply 12 being approximately the same as that between the edges of plies 11 and 12. The rubber layer 13 may be approximately .020" thick for a 6.00–16 tube.

A succeeding step is the placement of a rubber base strip 14 with one edge overlapping an edge of layer 13 and the stepped-off edges on one side of plies 11 and 12, as will be seen by reference to Fig. 1. The strip 14 extends laterally a distance beyond the edge of ply 11, said distance in a 6.00–16 tube being approximately 4". Strip 14 forms an individual base for the inner compartment. It is of greater thickness than the layer 13, the strip 14 being approximately .060" for a 6.00–16 tube.

Figure 3:
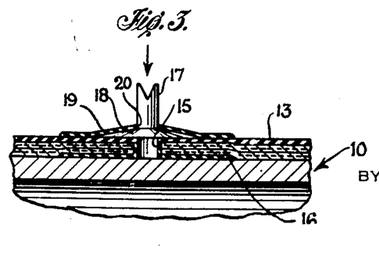
Fig. 3 is an enlarged detail sectional view of a portion of the structure shown in Fig. 1.

The assembly of members 11, 12, 13 and 14 just described is now removed and laid on a table and a valve hole 15 (see Fig. 3) is punched through members 11, 12 and 13 approximately 3½" from the edge of ply 11. A disc 16 of rubber is centered over valve hole 15 against ply 11. The purpose of disc 16 is to cover the exposed fabric of plies 11 and 12 along the sides of valve hole 15. Accordingly disc 16 is ruptured over hole 15 and the edges of the rupture are pressed into the hole against the cords forming the sides of the hole until the ruptured edges of the disc contact the rubber layer 13. A rubber flutter valve 17, having a base 18, is attached to layer 13, with a longitudinally extending hole through valve 17 aligned with valve hole 15. A rubber disc 19, having a central hole 20 punched therethrough, is placed over the valve stem 17 as shown in Fig. 3. Valve 17 is a molded valve which flutters shut when air rushes through it in the direction indicated by the arrow in Fig. 3. Its base may be buffed and cemented, or otherwise treated, if found desirable, to improve the union between said base 18 and layer 13. It is pointed out that plies 11, 12, layer 13 and strip 14 could be assembled and built into a band and then placed on building drum 10, in which case the valve hole 15 would be punched and members 16, 17, 18 and 19 would be assembled before said members were placed on the said drum.

Figure 2:
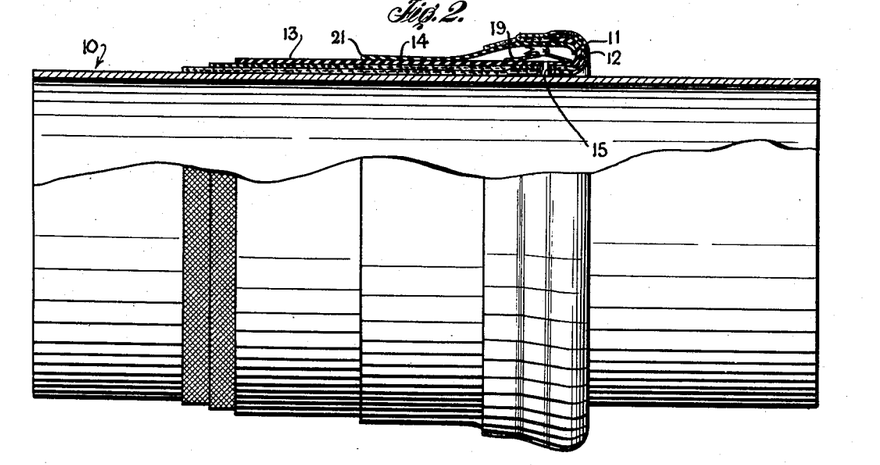
Fig. 2 is a similar section showing one edge of the components of Fig. 1 folded back on the radial outer surface of the assembled components of Fig. 1.
Figure 4:
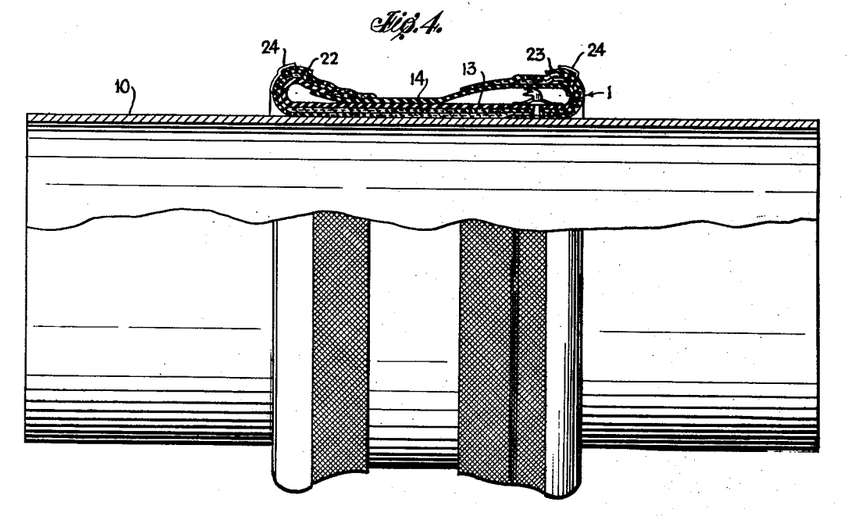
Fig. 4 is a view similar to Fig. 2 showing the other edge portion of the components of Fig. 1 folded back and lapping over the first folded edge.
Figure 5:
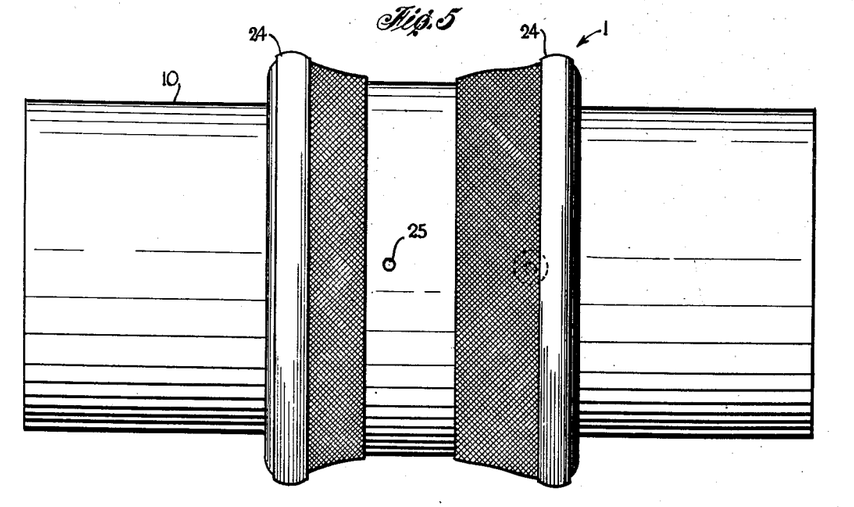
Fig. 5 is the same as Fig. 4 except shown in longitudinal elevation only and showing the location of a valve hole relatively to other components of the inner compartment.

Figs. 2 and 4 illustrate steps in folding the assembly shown in Fig. 1 to form the said inner compartment of the safety tube. Before folding, the upper surface of rubber layer 13 and rubber strip 14 are dusted with soapstone, or otherwise treated to prevent the tacky surfaces from adhering when in contact, as will be understood by those familiar with working rubber. In said dusting approximately 2" of the lateral edge of layer 13 opposite strip 14 is not dusted, and this 2" margin may be washed with a rubber solvent such as gasoline, in order to clean the area and to insure the surface being tacky. The edge, of which strip 14 is a part, is turned back over the assembly as indicated in Fig. 2 with strip 14 in contact with layer 13, and with the edge 21 of strip 14 set to a circumferentially extending line, not shown, which in case of the present 6.00–16 tube is approximately 3" beyond, or as shown in Fig. 2, to the left of the center of the said assembly. With the base strip 14 and the adjacent edges of members 11, 12 and 13 folded as just explained, a circumferentially extending line is drawn on the base strip 14 approximately 2" from its folded edge. Next the left hand edge of said assembly, as illustrated in Fig. 4, is folded back over its self until its lateral edge falls along said line drawn on base strip 14 leaving approximately 2" of said base strip exposed between the opposite marginal edges of rubberized fabric ply 11. It will now be seen that in the present 6.00–16 tube the edge surfaces of strip 14 and layer 13 overlap about 2". These lapped edges are next firmly rolled or stitched to insure good adhesion therebetween pending vulcanization. It is important to note at this stage of the fabrication of the tube 40 that a composite fluid tight inner compartment or tube, referred to as a whole as 1, has been formed. This is important since an object of the invention is to provide a safety tube having an inner and an outer compartment wherein the compartments are in the form of tubes each complete within itself and of toroidal shape when inflated.

Two adhesive rubber strips 22 and 23 approximately 1" in width and .030" thick are next set to circumferentially extending lines, not shown, drawn on the tube 1. One said line is drawn 1½" toward the left side from the nearest edge of ply 11, and another line is drawn 1½" toward the right from the farthest edge of ply 11, said rubber strips 22 and 23 being set to and lying outside of these lines in reference to said exposed base portion of tube 1. Next one or more coats 24 of anti-stick material, such, for example, as shellac is spread over approximately one half of the surface of strips 22 and 23 as shown in Fig. 4. It is to be noted that it is the lateral outer half of strip 22 and 23 relatively to the base of tube 1 which is covered, or coated with the anti-stick material.

A valve hole 25 for the main or inflating valve is now punched through strip 14, this valve hole 25 being axially offset in the same radial plane with valve hole 15 and being further located to the left of the center of said exposed portion of base strip 14 approximately 1⅛". The relative locations of the said valve holes are important it having been found that the locations as shown makes possible satisfactory drainage of condensate from the finished tube, as will be explained hereinafter.

Figure 6:
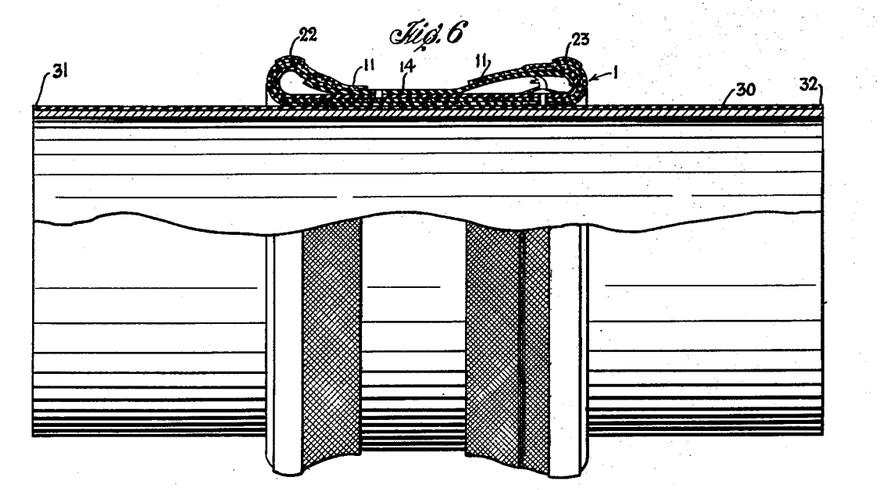
Fig. 6 is a view similar to Fig. 4 but showing the said inner compartment of Fig. 4 centered on a layer of rubber on the building drum.

The tube 1 is next removed from the building drum and laid aside while a strip of rubber 30 is formed into a band on drum 10, or the strip may be formed into a band of proper length and width and then placed on the drum. The tube 1 is now returned to drum 10 and is placed on strip 30 to left of center thereof, so that the left edge of the tube 1 is about 3½" from the left edge of strip 30 as will be seen by reference to Fig. 6. A circumferentially extending line, not shown, is drawn ¾" from the left hand edge of ply 11 toward the right of tube 1. The left hand edge portion 31 of cover 30 is now turned back over tube 1 until the edge of portion 31 coincides with said latter mentioned line. At this stage of the tube construction a small excess of soapstone. or similar material, is placed on strip 30 so that said soapstone may be folded into the assembly between the outer and inner tube where in service the soapstone, or similar material, insures adequate lubrication between the walls of said inner and outer tubes and prevents the generation of electrical charges. Next the right hand edge portion 32 is turned back on tube 1 over said soapstone until edge portion 32 laps the left hand edge 31 by ¼" thus forming an outer tube 40 with the base portions of the tubes 1 and 40 in contact with each other.

The next step is cutting a hole 25' in strip 30 for said main valve, this hole being cut in alignment with and forming an extension of valve hole 25, previously cut through the base portion 14 of tube 1.

Figure 7:
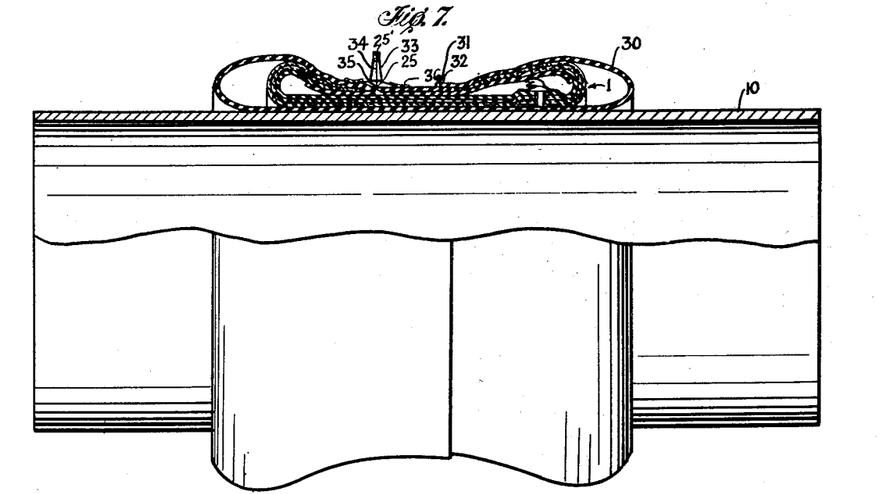
Fig. 7 shows the edges of said rubber layer of Fig. 6 folded about the inner compartment and jointed together to form the outer compartment of the tube with the tube inflating valve in position.

A tire tube valve 33, which may be of a conventional type, is attached to the tube and is so centered over hole 25 and its extension 25' that the passage through the stem 34 and base 35 of valve 33 communicates with hole 25 and its extension 25', the walls of strip 14 and strip 30 adjacent holes 25 and 25' being united in a fluid-tight joint, whereby tube inflation medium such as steam or r passes through valve 33 directly into the tube The base 35 is composed of rubber and is uffed and cemented before its attachment to the .ube. A rubber strip 36 overlaps the edge of the base 35 to prevent cracking in service at the edge.

The assembled tubes 1 and 40 united at their base portions are now removed from the drum 10 preparatory to molding and vulcanization in a tube mold 41. However, the invention is not to be limited to a particular type of tube mold as obviously molds of various types may be used without departing from the spirit of the invention.

Figure 8:
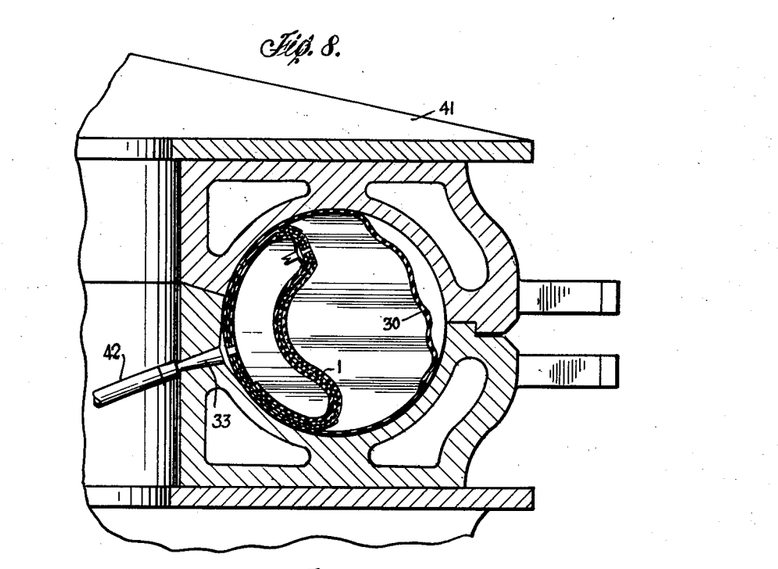
Fig. 8 shows the tube of Fig. 7 laid in a mold preparatory to inflation and vulcanization.
Figure 9:
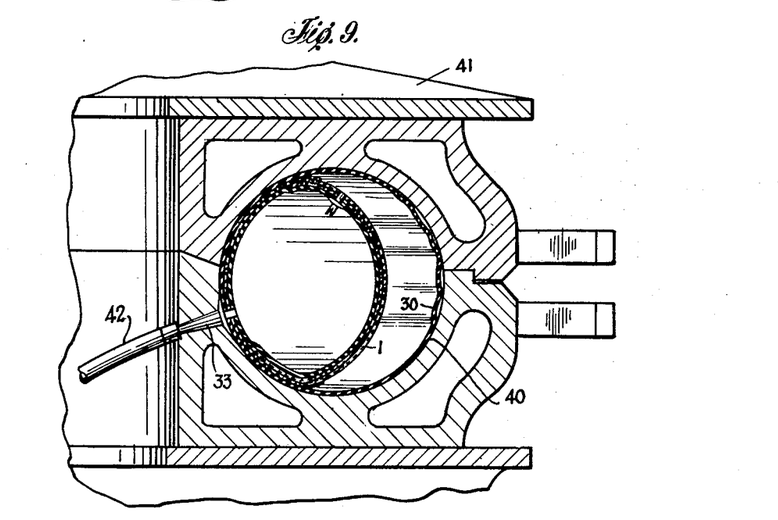
Fig. 9 illustrates the relative positions of the walls of the inner and outer compartments and the mold cavity surface during impulse inflation of the inner compartment.
Figure 10:
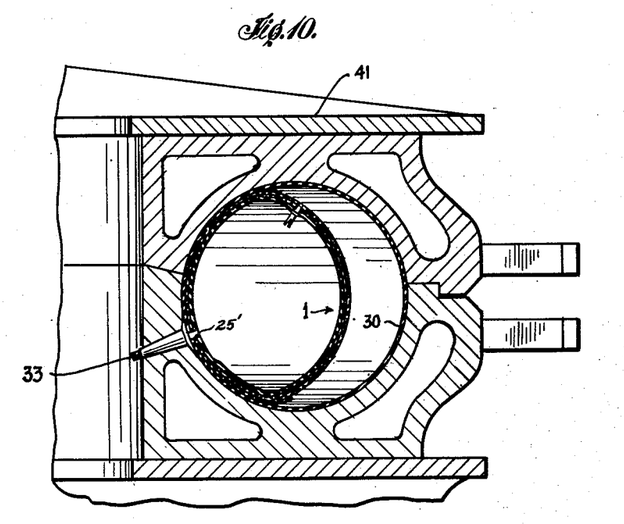
Fig. 10 is the same as Fig. 9 but showing the inner compartment in the position it occupies after it has been given its initial set vulcanization and the outer compartment is fully inflated during the last stages of vulcanization.

The tube 40 may be placed upon a conventional tube shaping ring in order to preform the tube to some degree in order to prevent buckling in the molding operation all of which will be understood by those familiar with the art. After the tube 40 has been laid in the mold 41 as shown in Fig. 8 a hose 42 is connected to the valve 33, it being understood that the valve "insides" have been removed to permit free flow through the valve. Mold 41 is not heated when tube 40 is laid therein and the first step in vulcanizing the tube 40 is the injection of steam for three seconds through hose 42 and valve 33, said hose being connected with a source of 85# steam supply. After the steam has been injected for three seconds the injection is stopped for five seconds. This injection of steam serves to inflate the tube 1 causing the tube 1 to fill out and to begin to vulcanize in its filled out position (see Fig. 9). During this first injection of steam some steam will pass through flutter valve 17, but due to low pressure within the tube 1, not enough steam will pass through the flutter valve to close it or to build up sufficient pressure and temperature in the tube 40 in the space intermediate tube 1 and the wall 30 of the tube 40 to begin the vulcanization of tube wall 30. It is to be understood that during the pause period that the steam flows through the valve 33 and hose 42 to the atmosphere, that is the pause is a blow-down period. This operation of steam injection for three seconds and blow-down for five seconds is repeated over a period of three minutes during which time the tube 1 receives sufficient vulcanization to cause it to become permanently set in its expanded form. It will be seen by reference to the drawing that tube 1 in its set shape is located centrally relatively to its great plane, that is, the center of the section of tube 1 lies in the plane which passes through the center of its base and is perpendicular to the axis of the tube. The mold 41 may be of any conventional steam jacketed type having steam inlet and outlet ports by which the mold is heated or cooled as desired as will be understood by those familiar with the art. After tube 1 has been given a satisfactory cure as just described steam is turned into mold 41 during which time full internal steam pressure is permitted to flow continuously through valve 33 and thence through valve 17 thus building up the full 85 pound steam pressure in both tubes 1 and 40 and pressing the wall 30 of tube 40 against the mold surface. Thus the molding and vulcanization of tube 40 is completed. At the end of the vulcanization period the steam is exhausted from the tube and the mold, after which cold water is turned into the mold compartments. However, for example, it has been found that best results are obtained when the valve on the blow-down line from the tubes is opened only slightly to permit the tube to deflate slowly over a period of four minutes in the case of a 6.00–16 tube. The next operation is opening the mold and quickly disconnecting the inflation line 42 from the tube to prevent the tube from swelling, and to remove the tube 40 from the mold as quickly as possible. The cooling of the mold is continued until its temperature does not exceed 150° F., after which the curing cycle may be repeated.

The invention contemplates the necessary mechanism to automatically effect and control the method of cure described herein above, said mechanism consisting of a cycle control device not only adapted to turn the steam in and out of the tubes by impulses but also to turn the steam and water in and out of the mold heating and cooling compartments and to open and close the mold all at predetermined intervals, all of which will be understood by those familiar with vulcanization operations in the manufacture of tubes and tires.

Figure 11:
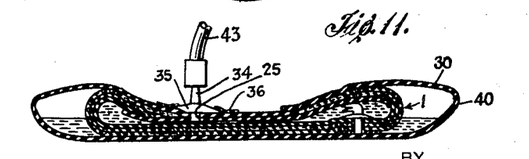
Fig. 11 is a sectional view showing the relative positions the valves occupy during an operation of ejecting water from the inner and outer compartments.
Figures 12, 13:
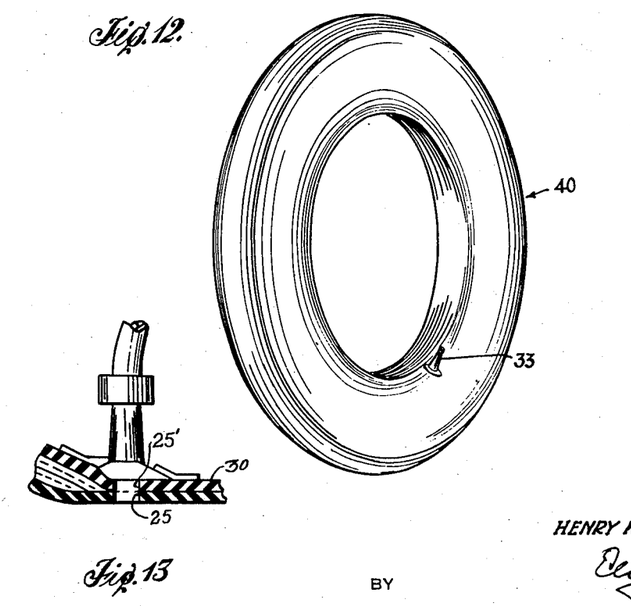
Fig. 12 is a perspective view of a finished tube embodying the present invention.
Fig. 13 is an enlarged fragmentary section of the valve assembly shown in Fig. 11.

After the tube 40 has been removed from the mold there often is an objectionable amount of water remaining in both said inner and outer compartments. This water is the steam condensate and must be removed from the tube, since otherwise it would be impossible to balance the tube for service. Since tube 40 is built with valves 17 and 33 in cross-sectional alignment the water is readily removable from the tube by the simple expedient of holding the finished tube 40 in such position that its valves are in the lowest position and then pressing the finished tube into the position illustrated in Fig. 11. Next attaching a vacuum line 43 to valve 33. As stated valves 17 and 33 are in the lowest portions of tubes 1 and 40 and accordingly the water flows to these valves, where due to the differential fluid pressure created by the vacuum, the water flows through said valves out of the tubes.

The sectional contour of the tube 40 is such that it will be subjected to very little stretch when it is mounted in a tire and in service. Accordingly the tube 1, forming the inner compartment of tube 40, being of a substantially less contour than tube 40, will occupy, due to its rigidity, a central position so that its central section lies in the plane which passes radially through the center of its base. Accordingly tube 1 remains both in dynamic and static balance in service. This, of course, is true of the outer tube also. When the tube mounted in the tire is subjected to inflation pressure the inflating air will enter through valve 33 and pass through the flutter valve 17 until the fluid pressure within the tube is equal in both the inner and outer compartments. Consequently tube 1 must depend upon its rigidity and not upon inflation pressure to maintain its balanced position. When the tube is in use on a vehicle, and a blow out occurs in a casing sustained by the tube 40 the air will quickly leave the compartment between the inner and outer tube and render useless the outer wall 30 of the tube 40. When this occurs tube 1 will not be blown out and flutter valve 17 will be closed by the rush of air therethrough; thus tube 1 will support the tire until the air leaks slowly out through the valve 17, thus giving the driver of an automobile on which the blow out has occurred, ample time to come to a full stop without danger. Tube 1 may be deflated through valve 33 preparatory to changing the tire. If a blow out or a tube failure should occur at the base of the tube 40 it will be seen that the air in the compartment intermediate tube 1 and wall 30 of tube 40 would not be affected except as it may escape through the flutter valve which escape would be gradual compared to a tire blow out and slow enough to permit the driver to come to a full stop before all air has escaped from the tube.

It will now be seen that the invention provides a novel method of building a new type of safety tube which is well adapted for the purpose intended. The tube constituting the present invention has been described as being composed of any material found satisfactory, such as for example, a synthetic rubber, or the elastomers now in common use.

A preferred embodiment of the present invention has been described but it is to be understood that the present disclosure is to be considered from illustrative standpoints and that the invention is to be limited only by the prior art and the appended claims.

What is claimed is:

1. A method of building an inflatable container for sustaining a pneumatic tire casing which comprises forming a first annular tube of unvulcanized rubber and rubberized fabric, forming a second annular tube of unvulcanized rubber entirely about the first formed tube with the base portions of said tubes adhered together, then subjecting the first tube to vulcanizing temperature for short intermittent periods of time with high pressure steam as the medium of heat, keeping the second tube free of internal pressure and vulcanizing temperature during the period of intermittent application of heat to the first tube, and then subjecting both tubes to vulcanizing temperature to complete vulcanization of both tubes.

2. A method of building a safety inner tube of the character described comprising forming a first annular tube of unvulcanized rubber and rubberized fabric, forming a second and larger annular tube of unvulcanized rubber entirely about said first tube, joining by adhesion said tubes at their base portions, laying said tubes so joined in a tube mold, at least partially vulcanizing the first tube by internal steam pressure therein while maintaining it in an expanded condition and while maintaining said second tube free of internal pressure and vulcanizing temperature, and then vulcanizing the second tube in an expanded condition, whereby said tube bases are permanently joined by vulcanization.

3. A method of building a safety inner tube of the character described comprising forming a first annular tube of unvulcanized rubber and rubberized fabric, forming a second and larger annular tube about said first tube, joining said tubes at their base portions, laying said tubes so joined in a tube mold, at least partially vulcanizing the first tube while intermittently maintaining it in an inflated condition by steam pressure while maintaining said second tube free of pressure and vulcanizing temperature, and then vulcanizing the second tube in an expanded condition, whereby said tube bases are permanently joined by vulcanization.

4. A method of building a safety inner tube of the character described comprising forming an annular tube of unvulcanized rubber and fabric, forming a second and larger annular tube about said first tube, joining by adhesion said tubes at their base portions, laying said tubes so joined in a tube mold, at least partially vulcanizing the first tube while maintaining it in an expanded condition with its cross sectional center line lying in a plane which is perpendicular to the axis of said first tube and passes through the center of the base of said first tube while maintaining said second tube free of pressure and vulcanizing temperature, and then vulcanizing the second tube in an expanded condition, whereby said tube bases are permanently joined by vulcanization.

5. A method of building a safety inner tube of the character described comprising forming a first annular tube of unvulcanized rubber and fabric, forming a second and larger annular tube about said first tube, joining by adhesion said tubes at their base portions, laying said tubes so joined in a tube mold having less than vulcanizing temperature, at least partially vulcanizing the first tube by intermittent inflation by steam while maintaining said first tube in an expanded condition with its cross sectional center line lying in a plane which is perpendicular to the axis of said first tube and passes through the center of the base of said first tube, maintaining said second tube free of pressure and vulcanizing temperature, and then heating said mold to vulcanizing temperature and vulcanizing the second tube in an expanded condition, whereby said tube bases are permanently joined by vulcanization.

6. A method of building a tube of the character described comprising forming a first tube by building the components which form the wall thereof on a flat tube building drum, cutting a hole through said wall, applying a flutter valve to said wall with a passage through the flutter valve aligned with said hole, folding the edges of said band over and into lapped relation thereby forming the body portion of said first tube, removing said body portion from said building drum, placing a strip of rubber on the building drum and forming it into a band thereon, next placing said body portion of the first tube on the building drum in superimposed relation to said rubber strip, said first tube body being placed off-center on said strip with base of the first tube facing radially outwardly, folding and over-lapping the edges of said rubber strip over the first tube in such manner that the over-lapped edges of the rubber strip are superimposed relatively to the base of the first tube, thereby forming a second tube about the first tube with the base portions of the two tubes in adhesive contact, forming a valve hole through the said base of said tubes, said valve hole being placed in transverse alignment with the valve hole through the wall of the first tube, applying a main valve to the base of the outer tube with a hole through the stem of said main valve aligned with the hole through the base of said tubes, removing the so-formed tubes from the building drum and placing said tubes in a vulcanizing mold whose temperature is less than vulcanizing temperature, beginning the molding and vulcanizing of said tubes by intermittently turning steam into and out of said tubes, the temperature and the time the steam is turned on at any one of the first intervals being insufficient to press the wall of the second tube against the mold, but being sufficient to inflate and start the vulcanization of the walls of the first tube, continuing turning the steam in and out of the tubes until the first tube has received sufficient vulcanization to become set in its expanded condition, heating the mold to a temperature sufficient to cause vulcanization and then leaving the steam turned into the tube for a time sufficient to force the wall of the second tube against the mold whereby vulcanization and molding of the tubes are completed.

7. A method of building a tube of the character described comprising forming a first tube by building the components which form the wall thereof, in a flat unvulcanized band on a building drum, cutting a hole through said wall, covering the side of said hole through the said wall with rubber, associating a flutter valve with said wall with a passage through the flutter valve aligned with said hole, folding the edges of said band over into lapped relation thereby forming the body portion of said first tube, removing said body portion from the building drum, placing a strip of unvulcanized rubber on the building drum and forcing it into a band thereon, next placing said body portion of the first tube on the building drum in superimposed relation to said rubber strip, said first tube body being placed off-center on said strip with the base of the first tube facing radially outwardly, folding and over-lapping the edges of said rubber strip over the first tube in such manner that the over-lapped edges of the rubber strip are superimposed relatively to the base of the first tube, thereby forming a second tube about the first tube with the base portions of the two tubes in adhesive contact, forming a valve hole through the said base of said tubes, said valve hole being placed in transverse alignment with said valve hole through the wall of the first tube applying a main valve to the outside surface of the outer tube with a hole through the stem of the main valve aligned with the hole through the base of said tubes, removing the so-formed tubes from the building drum and placing said tubes in a vulcanizing mold whose temperature does not exceed 150° F., beginning the molding and vulcanizing of said tubes by intermittently turning steam into and out of said tubes, the temperature and the time the steam is turned on at any one of the first intervals being insufficient to press the wall of the second tube against the mold, but being sufficient to inflate and start the vulcanization of the walls of the first tube, continuing turning the steam in and out of the tubes until the first tube has received sufficient vulcanization to become set in its expanded condition, while maintaining said first tube in an expanded condition with its cross-sectional center line lying in a plane which is perpendicular to the axis of said first tube and passes through the center of the base of said first tube, heating the mold to a temperature sufficient to cause vulcanization and then leaving the steam turned into the tubes for a time sufficient to force the wall of the second tube against the mold whereby vulcanization and molding of the tubes are completed.

8. A method of building a safety inner tube comprising forming a first annular tube of reinforced unvulcanized rubber, forming a second and larger annular tube about said first tube with base portions of said first and second tubes in contiguous engagement, confining said tubes within a mold, intermittently introducing heated fluid into the interior of said first tube to maintain said tube inflated while effecting partial vulcanization thereof, and thereafter introducing a heated fluid to the interior of both tubes to complete vulcanization with base portions thereof bonded together.

9. A method of constructing a safety inner tube consisting of the steps of constructing an annulus of reinforced rubberlike material, enclosing said annulus within a larger annulus of rubberlike material, maintaining base portions of said tubes in contiguous engagement, providing an orifice in said first tube, spaced from the base portion thereof for the restricted intercommunication of fluid between the interior of said first and second tubes, providing registered apertures in said first and second tubes for the reception of a valve assembly, confining said tubes within an annular mold cavity substantially of the size of said second tube when in an inflated but non-expanded condition, introducing to the interior of said first tube, through said registered apertures, a heating fluid under sufficient pressure to maintain said first tube expanded, and at a sufficient temperature to effect, over a pre-determined time interval, a partial vulcanization thereof, with said fluid largely confined to the interior of said first tube by reason of restricted flow thereof to the second tube through said orifice, intermittently removing and reintroducing said heating fluid to prevent equalization thereof between said first and second tubes through said orifice for a sufficient period of time to render said first tube form-sustaining, through partial vulcanization thereof, and thereafter continuously introducing heating fluid for a time period sufficient to effect pressure equalization between the interiors of said first and second tubes and complete vulcanization thereof with said contiguously engaged base portions bonded together.

HENRY K. CHANDLEY.

REFERENCES CITED

The following references are of record in the file of this patent:

UNITED STATES PATENTS

| Number | Name | Date |
|---|---|---|
| 2,090,210 | Lee | Aug. 17, 1937 |
| 2,161,775 | Miller et al. | June 6, 1939 |
| 2,190,202 | Arey | Feb. 13, 1940 |
| 2,253,759 | Burkley | Aug. 26, 1941 |
| 2,290,617 | Ickes | July 21, 1942 |
| 2,305,053 | Zimmerman | Dec. 15, 1942 |
| 2,372,382 | Krusemark | Mar. 27, 1945 |

Certificate of Correction

Patent No. 2,514,183                                                  July 4, 1950

HENRY K. CHANDLEY

It is hereby certified that error appears in the printed specification of the above numbered patent requiring correction as follows:

Column 1, line 17, for the words "danger of" read *danger to*; line 37, for "over" read *ever*; column 10, line 8, for "forcing" read *forming*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*